United States Patent [19]

Basavanhally

[11] Patent Number: 5,483,611

[45] Date of Patent: Jan. 9, 1996

[54] APPARATUS FOR ALIGNING OPTICAL FIBERS IN AN X-Y MATRIX CONFIGURATION

[75] Inventor: Nagesh R. Basavanhally, Trenton, N.J.

[73] Assignee: AT&T Corp., Murray Hill, N.J.

[21] Appl. No.: 296,384

[22] Filed: Aug. 26, 1994

[51] Int. Cl.[6] .................................................. G02B 6/36
[52] U.S. Cl. ................................................ 385/78; 385/83
[58] Field of Search ................................ 385/53–56, 59, 385/65, 71, 76–78, 83

[56] References Cited

U.S. PATENT DOCUMENTS

| | | | |
|---|---|---|---|
| 4,046,454 | 9/1977 | Pugh, III | 385/59 |
| 4,214,812 | 7/1980 | de Mendez | 385/59 |
| 4,575,183 | 3/1986 | Parchet et al. | 385/83 |
| 4,744,627 | 5/1988 | Chande et al. | 385/83 |
| 4,818,058 | 4/1989 | Bonanni | 385/71 |
| 5,134,673 | 7/1992 | Stephenson et al. | 385/56 |
| 5,185,846 | 2/1993 | Basavanhally et al. | 385/137 |
| 5,281,884 | 1/1994 | Basavanhally et al. | 310/328 |
| 5,337,384 | 8/1994 | Basavanhally et al. | 385/54 |
| 5,345,323 | 9/1994 | Basavanhally et al. | 385/59 |

*Primary Examiner*—John D. Lee
*Attorney, Agent, or Firm*—Katharyn E. Olson; Roderick B. Anderson

[57] ABSTRACT

Apparatus for holding optical fibers in a matrix configuration comprises a holder member (20) and a pair of parallel alignment members (25) extending in an X direction and attached to the holder member. A plurality of fiber support members (11), each containing a column of optical fibers (13) are arranged side-by-side in the X direction, such that the end surfaces of the optical fibers form an X-Y matrix configuration. First and second alignment pins (16) bear against opposite sides of each fiber support member. Each alignment pin extends beyond the fiber support member and bears against a reference surface of one of the alignment members (25). Clamping means (27) connected to the holder member forces the alignment pins against the reference surfaces of the alignment members. By making the reference surfaces in the alignment member of the requisite precision, one insures relative alignment of the fiber support members (11) with respect to each other. The holder member (20), in turn, includes an adjustment mechanism (37) for adjusting the angular orientation of the X-Y matrix configuration of fiber ends.

25 Claims, 2 Drawing Sheets

APPARATUS FOR ALIGNING OPTICAL FIBERS IN AN X-Y MATRIX CONFIGURATION

TECHNICAL FIELD

This invention relates to optical fiber alignment apparatus and, more particularly, to apparatus for permanently arranging the ends of optical fibers in a desired configuration.

BACKGROUND OF THE INVENTION

The U.S. patent of Basavanhally et al., U.S. Pat. No. 5,185,846, granted Feb. 9, 1993, hereby incorporated by reference herein, describes the need for arranging the ends of optical fibers in an X-Y matrix configuration for such purposes as free-space photonics switching. Such switching would allow selective transfer of light from one optical fiber bundle to another optical fiber bundle such that any of various pairs of fibers from the two bundles could be temporarily interconnected. The successful functioning of such devices requires that free end surfaces of the optical fibers of each bundle be arranged in a predetermined configuration such as an X-Y matrix to within tolerances as small as one micron or less than one micron.

The Basavanhally et al. patent teaches the use of photolithographic masking and etching for making a matrix array of apertures into which the optical fiber ends can be inserted with the aid of guiding apparatus described in the patent. While this technique is sufficiently precise, considerable skill and time are required for the fabrication and assembly, of the disclosed apparatus. It would be desirable to reduce the skill, expense and time necessary for making such apparatus.

The invention makes use of the technology described in the U.S. patent of Bonanni, U.S. Pat. No. 4,818,058, granted Apr. 4, 1989, hereby incorporated by reference herein, which describes an optical fiber connector comprising a pair of support elements on opposite sides of a plurality of parallel optical fibers. The support elements are made of monocrystalline silicon into which matching V-grooves have been formed by photolithographic masking and etching. Each fiber is held within matching V-grooves of the two support elements. The connector contains a pair of alignment pins which allows it to be joined to another identical connector to splice together two arrays of optical fibers.

SUMMARY OF THE INVENTION

In one embodiment of the invention, apparatus for holding optical fibers in a matrix configuration comprises a holder member, and a pair of parallel alignment members extending in an X direction and attached to the holder member. A plurality of fiber support members, each having first reference surfaces on opposite sides thereof, contain a column of optical fibers as described in the Bonanni patent, the end surfaces of the fibers arranged successively in a Y direction. The fiber support members are arranged side-by-side in the X direction, such that the end surfaces of the optical fibers form an X-Y matrix configuration.

First and second alignment pins bear against the first reference surfaces of each fiber support member as described in the Bonanni patent. Each alignment pin extends beyond the fiber support member and bears against a second reference surface of one of the alignment members. Clamping means connected to the holder member force the alignment pins against the second reference surfaces of the alignment members. By making the second reference surfaces of the requisite precision, one insures relative alignment of the fiber support members with respect to each other. The holder member, in turn, includes an adjustment mechanism for adjusting the angular orientation of the X-Y matrix configuration of fiber ends as may be needed for correcting small misalignments of the alignment members. The invention therefore permits the assembly of highly precise X-Y matrix configurations of optical fibers using the comparatively well-developed technology of the Bonanni patent.

These and other features, benefits and advantages of the invention will be better understood from a consideration of the following detailed description taken in conjunction with the accompanying drawing.

DETAILED DESCRIPTION

Figure 1:
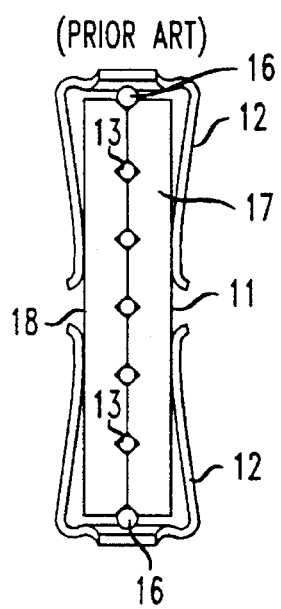
FIG. 1 is an end view of an optical fiber connector of the type described in the aforementioned Bonanni patent.

The drawings are not to scale, with certain dimensions being distorted to aid in clarity of exposition. FIG. I shows an optical fiber connector of the type described in the aforementioned Bonanni patent comprising an optical fiber support member 11 over which is clamped a spring member 12. The fiber support member contains a plurality of optical fibers 13 which are precisely aligned in the vertical direction. A pair of alignment pins 16 are pressed against reference surfaces of the optical fiber support member 11 by the spring member 12. In the Bonanni patent, the alignment pins 16 are used to align and abut the ends of optical fibers 13 with another array of optical fibers so as to splice the two arrays. In the present invention, they are used instead to arrange the optical fibers in a matrix configuration.

The optical fiber support member 11 comprises first and second fiber support elements 17 and 18 into which V-grooves have been etched for support of the optical fibers 13. The support members are made of a monocrystalline material such as silicon into which the V-grooves are made by photolithographic masking and etching. Because of the crystalline structure of members 17 and 18, such etching is anisotropic, with the walls of the V-grooves being precisely defined by crystal planes of the material. Consequently, the V-grooves can be made with great precision, and the optical fibers can be arranged in a precisely aligned column, as shown, to within tolerances of less than one micron. After assembly, the end surfaces of the fibers 13 are customarily polished along with fiber support member 11 so that they lie on a common plane. The optical fibers 13 am typically part of an optical fiber ribbon, the fibers being separated from the ribbon for insertion into the V-grooves.

Figure 2:
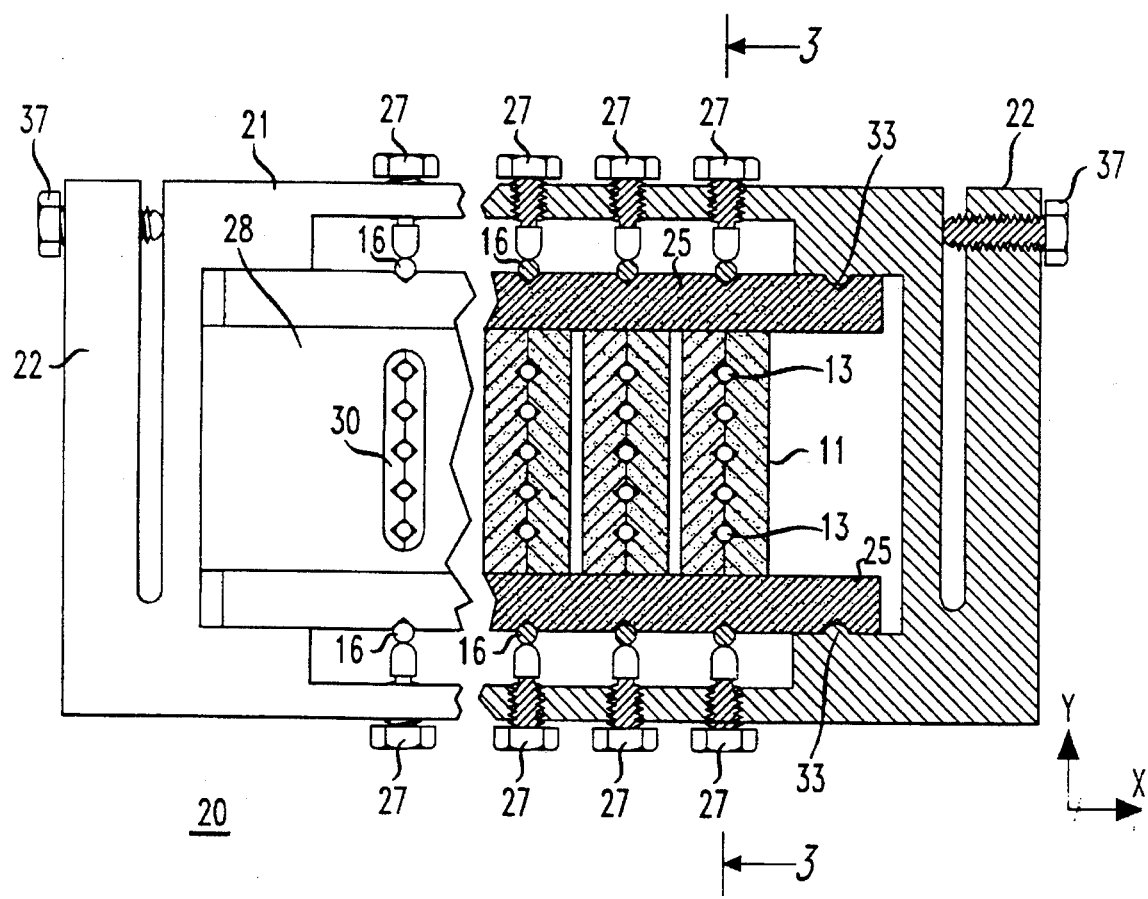
FIG. 2 is a schematic sectional view of optical fiber alignment apparatus in accordance with an illustrative embodiment of the invention.
Figure 3:
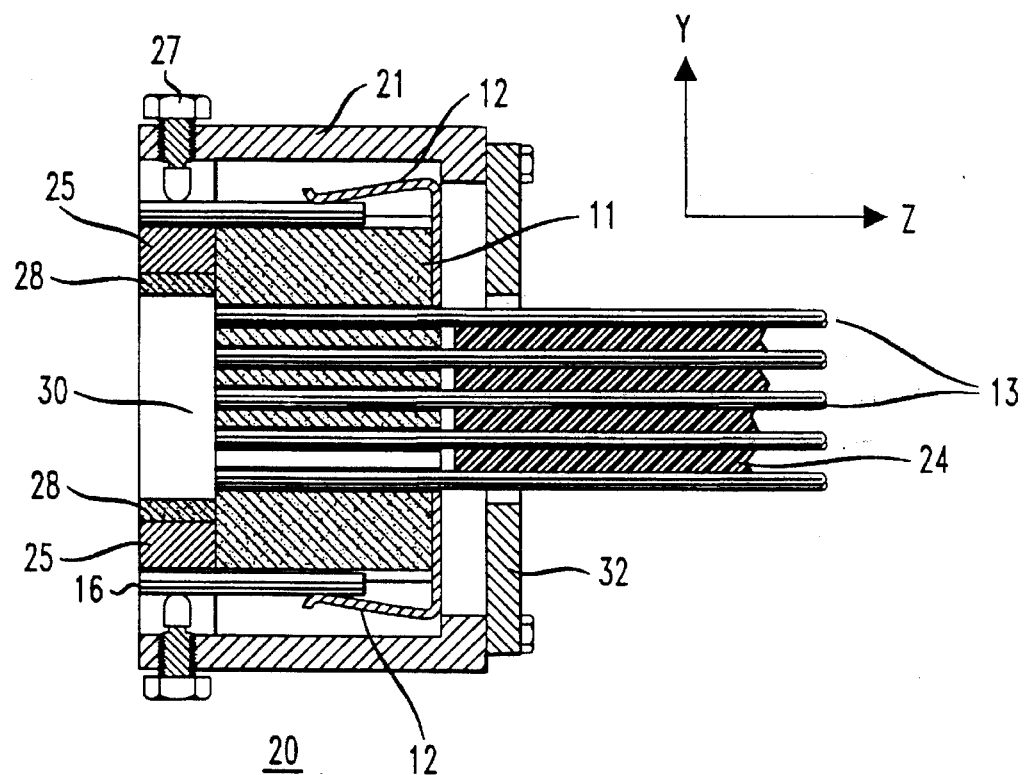
FIG. 3 is a view taken along lines 3—3 of FIG. 2.

In accordance with an illustrative embodiment of the invention, FIG. 2 shows how a plurality of optical fiber support members 11 are held in a side-by-side arrangement such that the ends of component optical fibers 13 are arranged in an X-Y matrix configuration. The fibers are held within a holder member 20 comprising an inner portion 21 and an outer portion 22. As shown in FIG. 3, free ends of the optical fibers 13 lie along a common plane defined by one surface of the fiber support members 11. The fibers extend in the Z direction, with the fibers from each support member typically being held together by plastic as an optical fiber ribbon 24.

As shown in FIG. 2, a pair of alignment members 25, extending in the X direction, are attached to the inner portion 21 of the holder member by an appropriate adhesive such as epoxy. Alignment members 25 may be of a monocrystalline material such as silicon into which V-grooves have been formed by photolithographic masking and etching. As described above, such V-grooves are made to within accuracies of less than a micron. Into each of these V-grooves one of the alignment pins 16 is fitted. Extending through the inner portion 21 of the holder member are a plurality of screws 27, each of which bears against an alignment pin 16. As shown in FIG. 3, the spring members 12 associated with each fiber support member 11 each engage a notch of an alignment pin 16 to hold it firmly in place to restrict axial movement as it is inserted into a V-groove of an alignment member 25.

The plurality of alignment pins 16 are slid into V-grooves of the alignment members 25 and thereafter clamped into place by screws 27 to stabilize and firmly hold the optical support members 11 in place. Thereafter, a plastic member 28 is inserted between the alignment members 25 and adhered by an adhesive for structural support. FIG. 2 shows only a fragmentary view of plastic member 28, it being understood that it extends the entire distance between the alignment members 25. The plastic member contains a window 30 associated with each fiber support member 11 for exposing the ends of a column of optical fibers 13. Referring to FIG. 3, the rear of holder member 20 includes a support portion 32 for supporting the optical fiber ribbon 24.

Figure 4:
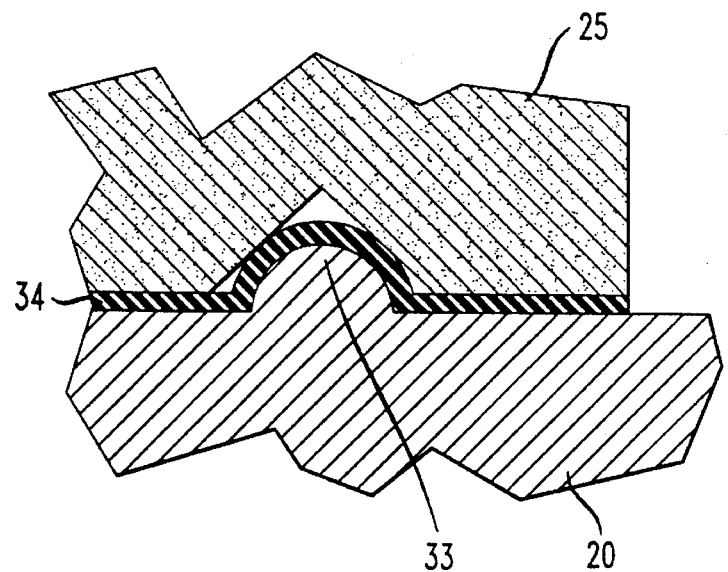
FIG. 4 is a detail of part of the apparatus of FIG. 2 showing how an alignment member can be accurately aligned to the holder member.

FIG. 4 is a detail showing how an alignment member 25 is aligned with respect to the holder member 20. The holder member 20 is machined to have a projection 33 in the shape of a cylindrical section. The alignment member 25 in turn has formed in it a V-groove (by masking and etching) into which the projection 33 is fitted. The cylindrical projection 33 is preferably made by electron discharge machining, a known process in which an electrical wire defines a line to be cut by electrical discharge; see e.g., "Nontraditional Manufacturing Processes," G. F. Benedict, *Marcel Dekker, Inc.*, New York and Basel, Switzerland, pp. 231–245. The projections 33 can be made by this method to within tolerances of about one micron. After seating the V-groove of the alignment member 25 over the projection 33, the alignment member is permanently adhered to the holder member 20 by a layer 34 of an adhesive such as epoxy.

Figure 5:
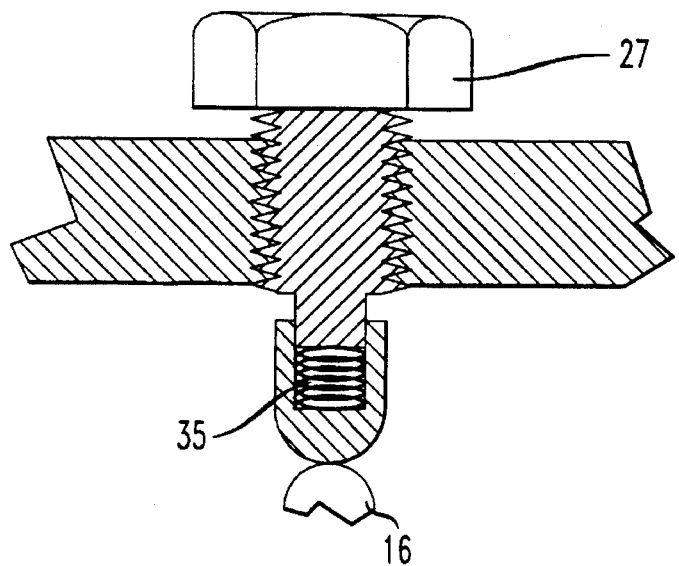
FIG. 5 is a sectional detail of part of the apparatus of FIG. 2 showing how an alignment pin can be clamped against an alignment member.

Thus, one can see that the alignment members 25 are first made to have V-grooves by masking and anisotropic etching, are thereafter fitted onto the holder member 20 by seating V-grooves into projections 33 of the holder member 20, and are adhered to the holder member with epoxy. Thereafter, the fiber support members 11 are inserted by sliding the alignment pins 16 into V-grooves of alignment members 25, whereupon screws 27 clamp the alignment pins in place. As shown in more detail in FIG. 5, the screws 27 are preferably of a type containing a spring 35 for controlling the force of the screw on the alignment pins 16. This prevents the screws from exerting enough force to crack the silicon alignment members 25.

Adjustment screws 37 extend through a wall of the outer portion 22 to bear on surfaces of the inner portion 21 of the holder member 20. This allows for final angular adjustment of the X-Y matrix formed by the optical fiber ends. The inner and outer portions 21 and 22 are preferably made of a single body of metal such as steel. Consequently, a deflection of the inner portion 21 by the adjustment screws 37 results from a flexture of the holder member 20. The use of flextures for controlling small displacements is described in more detail in the patent of Basavanhally et al., U.S. Pat. No. 5,281,884, granted Jan. 25, 1994, hereby incorporated by reference herein. Thereafter, the plastic member 28 is applied by adhesive, and the support portions 32 of FIG. 3 are applied, as by screwing, to provide structural support for the optical fiber ribbons.

Since the formation of projections 33 of FIG. 2 are accurate to within only about one micron, one alignment member 25 could be misaligned in the positive X direction by one micron, and the other misaligned in the negative X direction by one micron, for a total misalignment of two microns. This would not affect the relative positions of fiber support members 11 but would tilt slightly the columns of fibers 13 from the true vertical or Y direction. Consequently, the adjustment screw 37 can be used to compensate for, or to correct, this angular misalignment.

The invention exploits the relatively inexpensive availability of optical fiber connectors of the type shown in FIG. 1. The invention does require the construction of the alignment members 25 and the holder member 20, but this construction is less complex and expensive than the apparatus and procedure described in the Basavanally et al. patent. Further advances have recently been made which allow fiber support members to be mass-produced of plastic and which allow the spring member 12 to be incorporated into the fiber support member 11. Such developments will further reduce the cost of the present invention. There have also been recent advances in the machining of ceramic, which may allow alignment members 25 to be of ceramic, with the V-grooves being formed in them by machining, with tolerances of less than one micron.

While the illustrative embodiment shows each optical fiber support member containing only five optical fibers, in most practical embodiments significantly more fibers would be contained by each support member. A spring member could probably be devised as a substitute for the screws 27 for holding the alignment pins 16 in place. Free-space photonics switches could be devised using configurations for the fiber ends other than X-Y matrix configurations. Various other embodiments and modifications may be made by those skilled in the art without departing from the spirit and scope of the invention.

I claim:

1. Apparatus for holding the ends of optical fibers in a predetermined configuration comprising:

a holder member;

a pair of parallel alignment members extending in an X direction and attached to the holder member;

a plurality of fiber support members each having first reference surfaces on opposite sides thereof and each containing an array of optical fibers, each optical fiber extending in a generally Z direction, perpendicular to the X direction, with end surfaces of the fibers of the support member arranged successively in a Y direction, perpendicular to the X and Z directions;

the fiber support members being arranged side-by-side in the X direction, such that the end surfaces of the optical fibers form a predetermined configuration in substantially an X-Y plane;

a plurality of alignment pins, each alignment pin bearing against a first reference surface of a fiber support member and a second reference surface of an alignment member;

and clamping means connected to the holder member for forcing the alignment pins against the second reference surfaces of the alignment members.

2. The apparatus of claim 1 further comprising:

spring members associated with each of the fiber support members for forcing the alignment pins against first reference surfaces of the fiber support member.

3. The apparatus of claim 2 wherein:

each fiber support member comprises first and second fiber support elements each having an array of alignment grooves on one surface thereof;

and the optical fibers contained by each fiber support member are each clamped between matching alignment grooves of the first and second fiber support elements.

4. The apparatus of claim 3 wherein:

the holder member comprises an inner portion connected to an outer portion;

the alignment members are attached to the inner portion of the holder member;

and the outer portion comprises at least one adjustment member adapted to bear against the inner portion in a direction transverse to the Z direction to make fine adjustments in the positions of said optical fibers.

5. The apparatus of claim 4 wherein:

a plastic member is adhered to the first and second alignment members;

the plastic member containing at least one window for exposing the end surfaces of the optical fibers.

6. The apparatus of claim 5 wherein:

the fiber support elements and the alignment members are each made of a monocrystalline material;

and the array of alignment grooves in the fiber support elements and the reference surfaces in the alignment members are made by photolithographic masking and etching.

7. The apparatus of claim 4 wherein:

the inner portion of the holder member has at least one first side surface extending in the Y direction;

the outer portion has at least one second side surface facing the first planar side surface;

the adjustment member comprises at least one screw extending through part of the outer portion and bearing on a first surface of the inner portion;

and the inner and outer portions of the holder member are made of a single body of metal.

8. The apparatus of claim 7 wherein:

the clamping means comprises a plurality of second screws extending through part of the holder member, each such second screw abutting against one of the alignment pins.

9. The apparatus of claim 8 wherein:

the first reference surfaces of the fiber support members and the second reference surfaces of the alignment members are each V-grooves;

and the alignment member contains V-grooves opposite the second reference surfaces thereof for engaging a projection of the holder member, thereby to align the alignment member to the holder member.

10. The apparatus of claim 9 wherein:

the optical fibers extending in the Z direction from each fiber support member are interconnected as an optical fiber ribbon;

and a portion of the holder member individually supports each optical fiber ribbon.

11. The apparatus of claim 1 wherein:

a structural support member is adhered to the first and second alignment members;

the structural support member containing at least one window for exposing end surfaces of the optical fibers.

12. Apparatus for holding optical fibers comprising:

a plurality of optical fiber support members each comprising a pair of fiber support elements;

each fiber support element comprising a parallel array of first V-grooves;

a parallel array of optical fibers being contained within each fiber support member by matching V-grooves of the fiber support elements thereof;

first and second alignment pins bearing against first and second side surfaces of each fiber support member and extending beyond the support member;

a holder member;

first and second parallel alignment members having therein second V-grooves and being held by the holder member;

each of the first and second alignment pins being respectively abutted against second V-grooves of first and second alignment members such that a plurality of fiber support elements are held in parallel alignment.

13. The apparatus of claim 12 wherein:

the holder member comprises first means for clamping each of the first alignment pins into a second V-groove of the first alignment member and second means for clamping each of the second alignment pins into a second V-groove of the second alignment member.

14. The apparatus of claim 13 wherein:

the first and second clamping means each comprises a plurality of screws extending through part of the holder member, each screw abutting against one of the alignment pins.

15. The apparatus or claim 13 wherein:

the first and second alignment members are elongated members made of a monocrystalline material;

and the second V-grooves are made in the first and second alignment members by photolithographic masking and etching.

16. The apparatus of claim 15 wherein:

the second V-grooves are made in first surfaces of the alignment members;

third V-grooves are made in second surfaces of the alignment members opposite the first surfaces;

and the third V-grooves fit into portions of the holder member to assure alignment of the first and second alignment members with respect to the holder member.

17. The apparatus of claim 16 wherein:

each of the optical fibers has an end surface that is flush with a first surface of the optical fiber support member within which it is contained;

and the end surfaces of all of the optical fibers are arranged in an X-Y matrix configuration.

18. The apparatus of claim 17 wherein:

portions of the optical fibers held in each optical fiber support member extend from a second surface of the fiber support member opposite the first surface of the fiber support member;

said optical fiber portions extending from the second surface of each fiber support member being interconnected as an optical fiber ribbon;

and a portion of the holder member supports each optical fiber ribbon.

19. The apparatus of claim 17 wherein:

a plastic member is adhered to the first and second alignment members;

the plastic member containing at least one window for exposing the end surfaces of the optical fibers.

20. The apparatus of claim 19 wherein:

the first and second clamping means each comprises a plurality of screws extending through part of the holder member, each such screw abutting against one of the alignment pins.

21. The apparatus of claim 20 wherein:

the holder member comprises an inner portion connected to an outer portion;

the alignment members are attached to the inner portion of the holder member;

and the outer portion comprises at least one adjustment member adapted to bear against the inner portion in a direction transverse to the direction of the optical fibers held in the inner portion to make fine adjustments in the positions of said optical fibers.

22. The apparatus of claim 21 wherein:

the adjustment member comprises at least one screw threaded to the outer portion and adapted to bear against the inner portion;

and the inner and outer portions of the holder member are made of a single body of metal.

23. The apparatus of claim 12 wherein:

the holder member comprises an inner portion connected to an outer portion;

the alignment members are attached to the inner portion of the holder member;

and the outer portion comprises at least one adjustment member adapted to bear against the inner portion in a direction transverse to the direction of the optical fibers held in the inner portion to make fine adjustments in the positions of said optical fibers.

24. The apparatus of claim 12 wherein:

each of the optical fibers has an end surface that is flush with a first surface of the optical fiber support member within which it is contained;

and the end surfaces of all of tile optical fibers are arranged in an X-Y matrix configuration.

25. The apparatus of claim 24 wherein:

a structural support member is adhered to the first and second alignment members;

the structural support member containing at least one window for exposing the end surfaces of the optical fibers.

* * * * *